United States Patent [19]

Turner

[11] Patent Number: 5,179,551
[45] Date of Patent: Jan. 12, 1993

[54] NON-BLOCKING MULTI-CAST SWITCHING SYSTEM

[75] Inventor: Jonathan S. Turner, St. Louis, Mo.

[73] Assignee: Washington University, St. Louis, Mo.

[21] Appl. No.: 682,432

[22] Filed: Apr. 8, 1991

[51] Int. Cl.⁵ ............................................. H04Q 11/04
[52] U.S. Cl. ..................................... 370/60; 370/94.1
[58] Field of Search .............................. 370/60, 94.1; 340/825.5, 825.8

[56] References Cited

U.S. PATENT DOCUMENTS 4,804,956 2/1989 Boxall ............................. 340/825.79

Primary Examiner—Curtis Kuntz
Assistant Examiner—T. Chebretinsae
Attorney, Agent, or Firm—Rogers, Howell & Haferkamp

[57] ABSTRACT

A multi-cast switching system comprised of a pair of high speed data networks, each of said data networks being either a Benes network, a Clos network, or a Cantor network, and configured to provide point-to-point switching only in the first network and multi-cast switching in the second network, may be non-blocking for adding a multi-cast connection and re-arrangeably non-blocking for augmenting an existing multi-cast connection using the algorithm which essentially consists of identifying the most lightly loaded middle stage switch, connecting the input to the middle stage switch, and connecting the outputs to the middle stage switch. A minimal speed advantage for each type of network is presented and thereby reduces the cost of each network in order to achieve non-blocking operation.

14 Claims, 3 Drawing Sheets

BENES NETWORK: $B_{n,d}$     FIG. 1A.
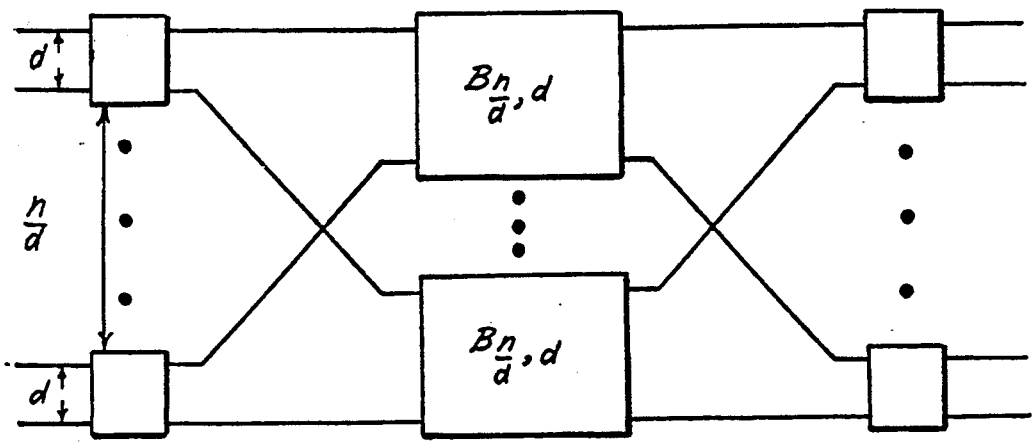
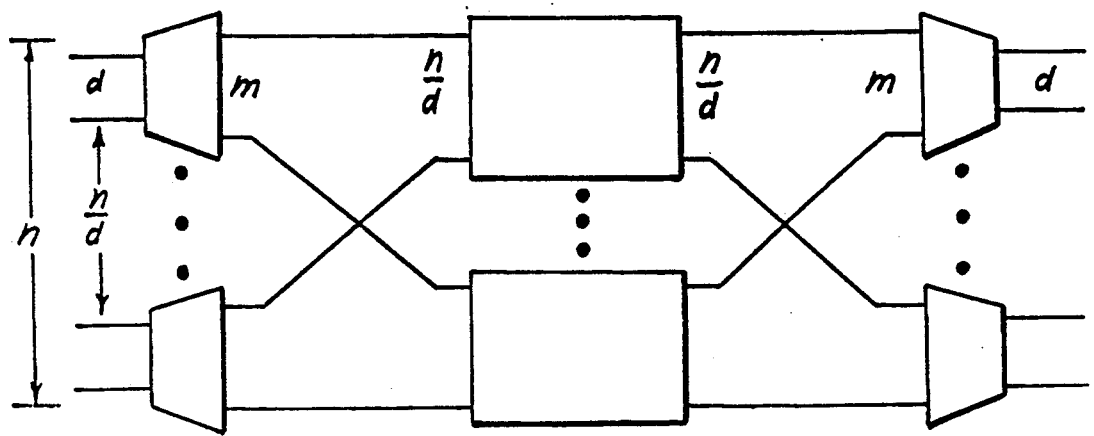
CLOS NETWORK: $C_{n,d,m}$     FIG. 1B.
CANTOR NET: $K_{n,d,m}$     FIG. 1C.
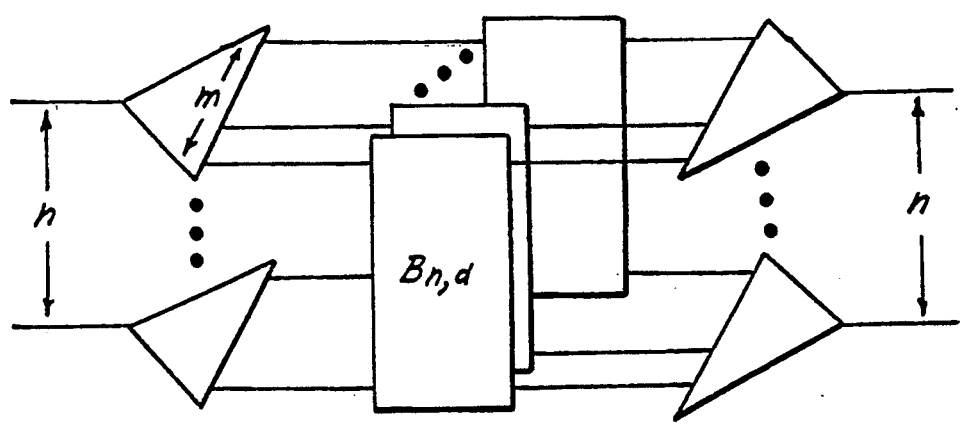

NON-BLOCKING MULTI-CAST SWITCHING SYSTEM

This invention was made with Government support under Grant No. DCI 8600947 awarded by the National Science Foundation. The Government has certain rights in the invention.

BACKGROUND AND SUMMARY OF THE INVENTION

There are several switching system manufacturers who have designed switching systems for high speed data networks, such as ATM networks, that employ a three-stage Benes network with fixed path routing comprising data links interconnecting each of the switches in adjacent stages. Examples of other well known high speed data packet switching networks include Clos networks and Cantor networks. In order for such a switching system to be non-blocking, the internal data links must be operated at a higher rate than the external links, i.e. the inputs and outputs to the switching system itself. The ratio of a switching system's internal data rate over its internal data links to its external data rate is called a switching system's speed advantage. Minimizing the required speed advantage in order to accommodate expected data traffic is important because the speed advantage contributes directly to the switching system's cost. For example, when a three-stage Benes network switching system is used to carry point-to-point traffic, a speed advantage of three is sufficient to ensure that blocking never occurs. Blocking is a term used to describe an unsuccessful attempt to transmit data over an internal data link, where the existing load on the internal data link when added to the additional load sought to be added would exceed its capacity.

In a switching system with fixed path routing, the route selected for a virtual circuit must take into account the bandwidth in use by other virtual circuits, requiring that a path hunt be performed as in circuit switched networks. Also, as in circuit switched networks, blocking can occur if there is no path through the network with sufficient bandwidth to carry the connection.

In his prior work, the inventor herein has previously shown that a k-stage Benes network comprised switching system can be operated in a non-blocking fashion with a speed advantage of k for point-to-point traffic. See Melon and Turner "Non-Blocking Multi-Rate Distribution Network," Washington University Computer Science Department, WUCS-89-34, the disclosure of which is incorporated herein by reference.

As disclosed herein, the inventor has succeeded in extending his analysis from point-to-point switching systems to switching systems carrying multi-point or multi-cast connections. With prior art methodology, a speed advantage of $\sqrt{}$ is required to make an n port network non-blocking for multi-point or multi-cast traffic. However, using the methodology disclosed herein, a five-stage network, comprised of two three-stage Benes networks connected back-to-back, can be operated in a nearly non-blocking fashion with a speed advantage of three. This reduces the cost of non-blocking multi-point switching by a factor of $0.2\sqrt{n}$. For a 256 port switch, the cost reduction is by a factor of 3.2 and goes up to 6.4 for a 1024 port switch. Also, the same methodology may be extended to incorporate the use of Clos and/or Cantor networks, with the system being structured with a pair of networks connected back-to-back, the first network handling point-to-point traffic only while the second network is permitted to accommodate multi-cast connections. For example, if two three-stage Benes networks are connected back-to-back, the resulting switch fabric is a five-stage switching system (the adjoining stages collapsing into a single stage to reduce the total stages from six to five). Thus, for this particular example, a 3:1 speed advantage will be all that is required for nearly non-blocking operation, with branching permitted only from stage three (the middle stage) on to the fifth stage. For new multi-cast connections, the switching system is strictly non-blocking in that any new multi-cast connection can be added without overloading any internal data link. The algorithm which accommodates the addition of a new multi-cast connection comprises the steps of: 1) identifying the most lightly loaded middle stage switch, labeled Z; 2) establishing connections between each desired multi-cast output and Z; and 3) connecting the input (labeled x) to Z. With this algorithm, a new multi-cast connection comprising the routing of a data packet from an input (x) to a plurality of outputs through the most lightly loaded middle stage switch (Z) may always be added.

A variation of this algorithm may also be used to augment an existing multi-cast connection by adding an output. If the output may not be conveniently added by adding an additional branch from a fourth stage or a third stage switch which already carries the connection, the augmented multi-cast connection may always be reestablished (much as a new connection) using the algorithm just mentioned. Therefore, at most, only one multi-cast connection need be re-routed, the one being augmented. All of the existing multi-cast connections may remain in place. Furthermore, in an ATM environment, the re-routing may be accomplished by changing the multi-cast translation tables in the switches comprising the third and fourth stages only, a process which requires less than one operation per switch. For example, rearranging a multi-cast connection in a 256 port switch requires making changes to at most ten of the multi-cast translation tables.

Generally, the technique for re-arranging an existing multi-point connection to augment it and add at least one additional end point includes the steps of first checking to see if a new branch may be added at any of the stages where branching is permitted. For a five-stage switching system comprised of two, three-stage Benes networks, these would be stages 3–5. Presuming that no additional branch could merely be added, and that re-arranging the existing multi-cast connection is required, the technique includes the steps of first identifying the most lightly loaded third stage switch (Z) and then identifying those fourth stage switches through which the connection passes and which are also connected to Z by links having sufficient capacity to carry the connection. Branches are then added from Z to each of those fourth stage switches. Then, those fifth stage switches having designated outputs for part of the connection which are not connected to the newly branched fourth stage switches are then identified and branches between each of those fifth stage switches and Z are established to complete the connection. With this technique, a multi-cast connection sought to be augmented may first be augmented through adding a branch. If no branch is available having sufficient bandwidth, then this single multi-cast connection is re-routed to accommodate the augmented multi-cast connection with minimal modification to multi-cast translation information in the switches comprising the switching system as other connections are not disturbed.

While the principal advantages and features of the subject invention have been described above, a more thorough understanding may be gained by referring to the drawings and description of the preferred embodiment which follow.

BRIEF DESCRIPTION OF THE DRAWINGS

FIGS. 1a, b, and c depict a generalized version of a Benes, Clos, and Cantor switch network;

DETAILED DESCRIPTION OF THE PREFERRED EMBODIMENT

The invention described herein is generally directed to high speed data packet switching systems which are utilized in various kinds of high speed data systems, including ATM networks, as is well known in the art. While the preferred embodiment disclosed and explained in some detail herein is directed to the use of Benes networks, and particularly three-stage Benes networks, it should be understood by one of ordinary skill in the art that the teachings included herein may be easily utilized with alternative high speed data packet switching networks. For example, as shown in FIG. 1a, a general depiction of a Benes network includes n inputs and n outputs with a plurality of n/d input switches and output switches, with each set of switches in each stage being connected to each set of switches in the preceding and successive stages, as shown representationally in FIG. 1a. For Benes network switching systems, the overall system will be non-blocking if the Benes network speed advantage is greater than or equal to $2k-1-2(k-2)d$, where $k=\log_d n$. Another type of high speed data packet switching network is shown in FIG. 1b as a Clos network having a similar architecture to that of the Benes except that the interior of the switch utilizes a plurality m instead of d inputs and outputs, with m being greater than d. For Clos network switching systems, the overall system will be non-blocking if the Clos network speed advantage is greater than or equal to $1+2d/m$. Obviously, for minimal cost, the speed advantage should approximate $1+2d/m$. Still another example of a high speed data packet switching network which may be utilized in the present invention is shown in FIG. 1c and includes a Cantor network which essentially connects a plurality of Benes networks in parallel. The Cantor network is non-blocking if the speed advantage is greater than or equal to $1+2(k-1)/m-2(k-2)/dm$. The following description of the preferred embodiment will describe in greater detail the present invention in terms of Benes networks. However, as noted, the Clos and Cantor networks may be substituted interchangeably.

Figure 2A:
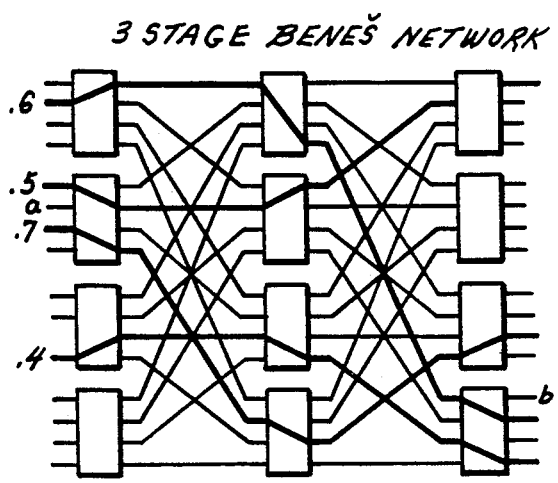
FIGS. 2a and b are schematic diagrams of a three-stage Benes network switching system exemplifying blocking.

As shown in FIGS. 2a and b, blocking readily occurs in a multi-cast switching system if connections are permitted to branch near the input side of the switching system. As shown in FIG. 2a, blocking can occur if there is no path through the network with sufficient bandwidth to carry a connection. On the left, or in the stage one switches, is shown a set of point-to-point connections having bandwidths equal to 0.6, 0.5, 0.7, and 0.4 where for simplicity we are letting the capacity of the networks internal data links be 1. Note that given the connection shown, there is no path from the input marked a in stage one to the output marked b in stage three that has enough bandwidth remaining for a new connection with a bandwidth of 0.65.

Figure 2B:
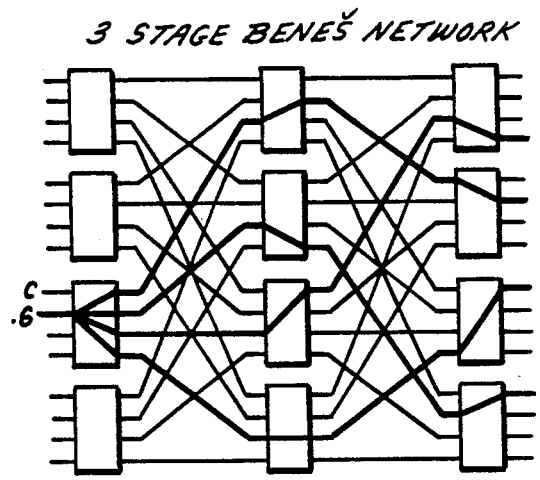

Carrying this example to a multi-cast switching scheme, FIG. 2b exemplifies blocking if the multi-path routing algorithm permits early branching. A single input branches in the third switch of the first stage with a 0.6 bandwidth to each of the four switches in the second stage and, then, to each of the four switches in the third stage. With this example, the 0.6 multi-cast connection blocks the establishment of any connection from the c input having a bandwidth greater than 0.4. To prevent blocking from occurring in the example configuration, a speed advantage of four is required.

Figure 3:
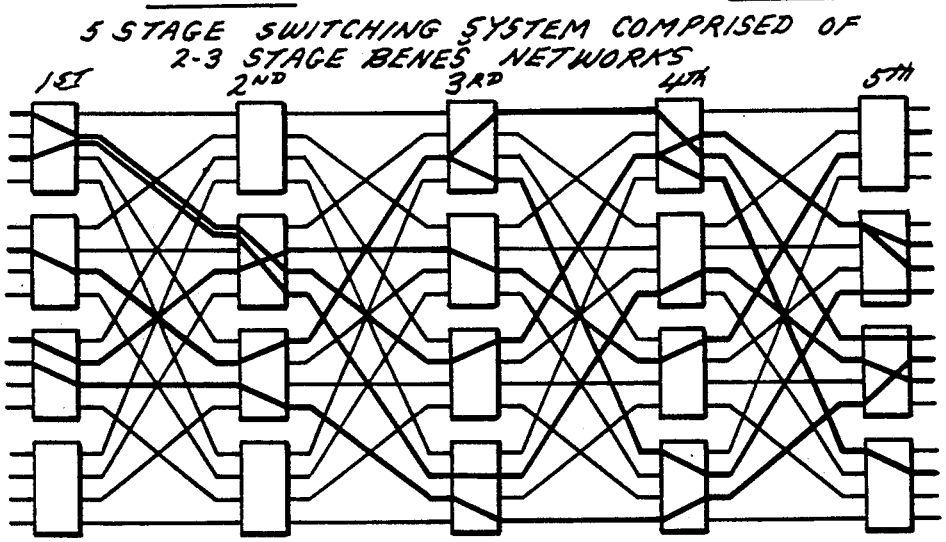
FIG. 3 is a schematic diagram of a five-stage multi-point switching system in which branching is limited to the last three stages.

A five-stage switching system comprised of two three-stage Benes networks connected back-to-back, with one of their connecting stages eliminated as redundant is shown in FIG. 3 in which branching is permitted for multi-point connections only in the last three stages. If this system is operated with a 3:1 speed advantage, it is always possible to add a new multi-cast connection, i.e. a multi-cast connection routed from a new input to a new set of outputs, without blocking. The algorithm for adding a new multi-cast connection from an input x to a set of outputs $[y_1, \ldots y_r]$ is as follows:

1. Find the most lightly loaded middle stage switch (that is the switch with the least amount of traffic passing through its outputs) and call it Z. The total bandwidth in use on Z's outputs is less than $\sqrt{n}/3$. Since Z has $\sqrt{n}$ outputs and since a data link must be carrying a total bandwidth of more than two-thirds to block a new connection (which can have a bandwidth of at most one-third), more than half of Z's outputs have enough bandwidth available to accept a new connection. Hence more than half of the switches in the fourth stage can be reached from Z.

2. Each output $y_i$ has a path to more than one-half the fourth stage switches as well. Hence, there is a path from Z to each $y_i$. By taking the union of these sets of paths, we can connect Z to every $y_i$.

3. Finally, note that since branching is not allowed in the first two stages, there are paths from the input x to more than half of the second stage switches and since Z is the most lightly loaded middle stage switch, there is a path from Z to more than half of the second stage switches. Hence, there is a path from x to Z.

Figure 4:
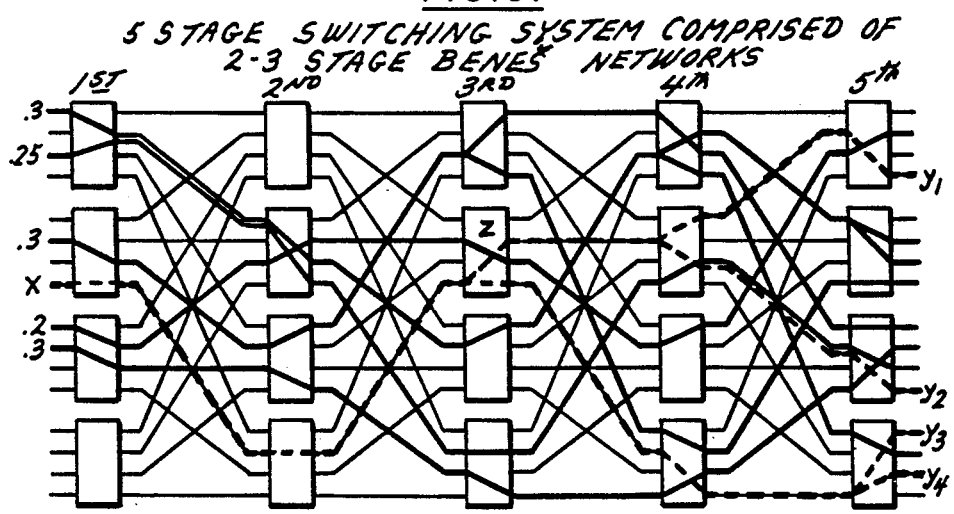
FIG. 4 is a schematic diagram of a five-stage multi-point switching system demonstrating the addition of a multi-cast connection without blocking.

As shown in FIG. 4, Z has been determined to be the most lightly loaded switch and a dotted line indicates the connections between x at the input, or first stage switch, and $y_1 - y_4$ outputs in the fifth stage switches. Hence, using the methodology of the algorithm explained above, a new multi-cast connection may be added to the five-stage network without blocking.

However, the network is not necessarily non-blocking if we are adding a new branch to an existing connection.

While most often such additions can be accommodated in a straightforward way, such as by merely adding a branch to the fifth stage switch from a fourth stage switch over an internal data link having sufficient free bandwidth to accommodate the connection, occasionally they require that the connection being augmented be rerouted. Hence, the network is only rearrangably non-blocking when we consider augmentation of existing multi-point connections, but the re-arrangement algorithm is quite simple because of two characteristics. First, only the connection being augmented need be re-routed. All other existing connections are not affected. Secondly, in an ATM environment, the re-routing is accomplished by changing the multi-cast translation tables in the third and fourth stage switches (for the example given of a five-stage network), which requires less than one operation per switch. For example, re-arranging a multi-cast connection in a 256 port switch requires making changes to at most ten of the multi-cast translation tables.

Figure 5:
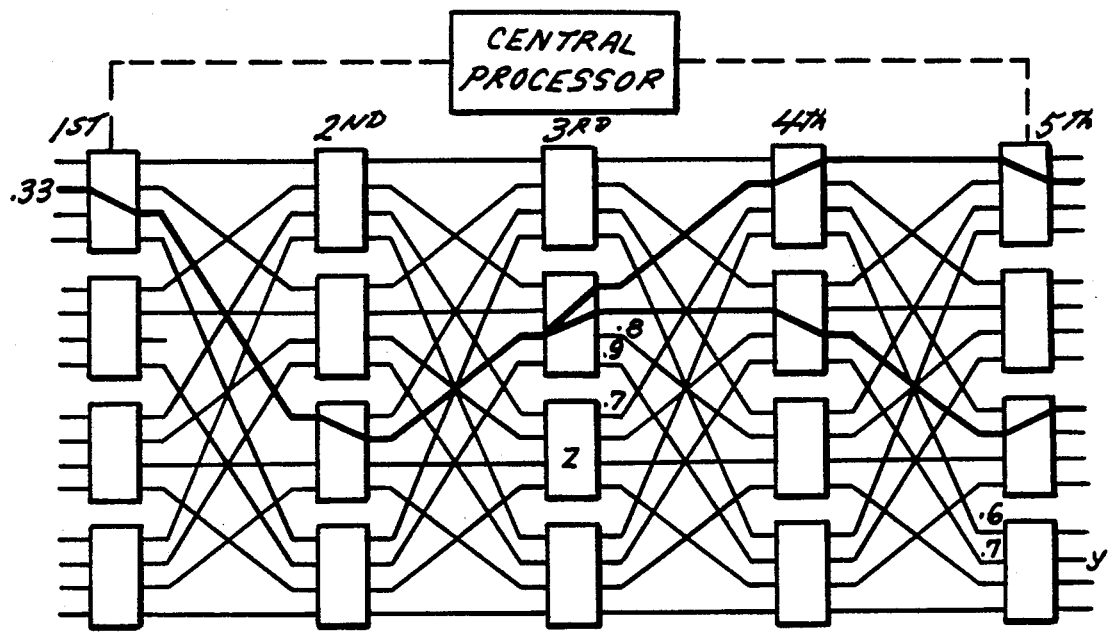
FIG. 5 is a schematic diagram of a five-stage multi-point switching system with a single multi-cast connection.
Figure 6:
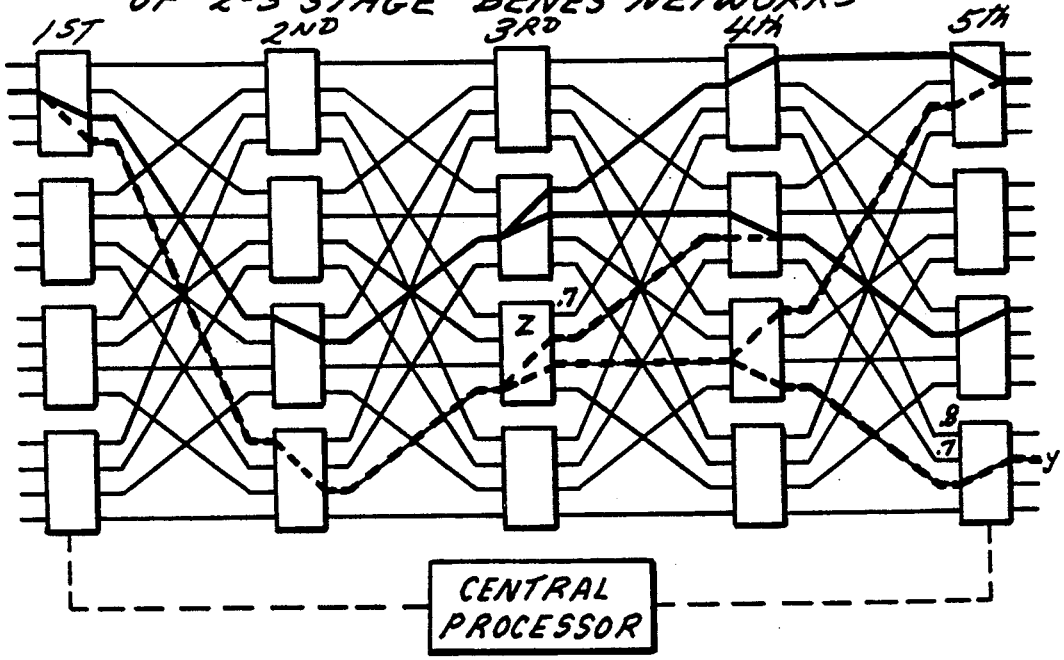
FIG. 6 is a schematic diagram of the switching system of FIG. 5 which has been re-routed in accordance with the invention in order to add an output at y.

Consider the connections shown in FIG. 5 and suppose that the existing multi-cast connection is sought to be augmented by adding a branch to output y. The numbers next to the selected links indicate the amount of bandwidth on those links by other multi-cast connections (not shown). Note that there is no path from y to any of the fourth-stage switches that the existing multi-cast connection passes through with sufficient available bandwidth. Also, there is no path from y to the third stage switch that the multi-cast connection passes through. Since branching is not allowed in the first two stages, some re-arrangement is required to add y to the existing multi-cast connection. Assume that the switch marked Z is the most lightly loaded switch in the third stage. Effectively, the existing multi-cast connection coupled with the augmented branch may be considered as a new multi-cast connection which may always be added to the five-stage network without blocking using the algorithm described above to perform the re-routing through Z. This re-routing is shown by the dotted lines in FIG. 6. Incidentally, a central processor is shown in FIGS. 6 as well understood by those of ordinary skill in the art, is used to access the translation tables resident in each switch of each stage of the overall network in order to change the routing of connections as they pass through the switch network.

The amount of re-routing operations may be minimized by noting that in typical implementations the multi-cast address translation information in a switch is independent of the input link that a packet is received on. Thus, the switches in the last stage of the network are unaffected by the re-routing operation, with the exception, of course, of the switch to which the new output y is added. Also, there is no need to modify the multi-cast translation information in the switches which the multi-cast connection no longer passes through after re-routing. Hence, the effectiveness of the operation is limited to one switch in each of the first three stages and the switches in the fourth stage. Moreover, it can be shown that at most half the switches in the fourth stage will be affected.

Turning now to the particular example depicted in FIGS. 5 and 6, i.e. that of a five-stage Benes switching system comprised of two three-stage Benes networks, the algorithm for adding a new output y to an existing multi-cast connection, i.e. augmenting an existing multi-cast connection, is as follows.

1. If there is a branch of the connection in the fifth stage switch containing y, add y to the connection at that point. Else, if there is an available path from y to a fourth stage switch that the connection passes through, connect y at that point. Else, if there is an available path from y to the third stage switch that the connection passes through, connect y by that path.

2. Let Z be the most lightly loaded third stage switch, let S be the set of fourth stage switches that the connection passes through and let T be the set of fourth stage switches that are connected to Z by links with at most 1-w units of bandwidth in use.

Add branches from Z to all switches in $S \cap T$.

Let W be the set of switches in the fifth stage that are joined to the connection by branches passing through a switch in S-T. Add a path from Z to each switch in W and a branch to y (using step 1).

The time required to perform a re-arrangement is never more than the time required to establish a multi-cast connection of size $\sqrt{}$ and is usually much less. As explained above, this re-arrangement is achieved by utilizing the central processor to rewrite multi-cast translation tables in the various switches being affected.

This same technique may be expanded to a five-stage Benes network which requires a speed advantage of $n^{2/3}$ in order to be non-blocking for multi-cast connections. Similarly, a nine-stage network with a speed advantage of five and operated in a fashion similar to that described above is non-blocking. The algorithm for adding an additional end point y to a nine-stage network is as follows.

1. If there is a branch in the ninth stage containing y, add y to connection at that point. Else, if there is a path from y to an eighth stage switch that the connection passes through, connect y at that point. Else, if there is a path from y to a seventh stage switch that the connection passes through, connect y at that point. Else, if there is a path from y to a sixth stage switch that the connection passes through, connect y at that point. Else, if there is a path from y to a fifth stage switch that the connection passes through, connect y at that point.

2. Otherwise, let Z be most lightly loaded fifth stage switch.

Let $S_6$ be the set of sixth stage switches that connection passes through.

Let $T_6$ be the set of sixth stage switches that can be reached from Z.

Let $S_7$ be the set of seventh stage switches that the connection passes through but which are not reached through a switch in $T_6$.

Let $T_7$ be the set of seventh stage switches that can be reached from Z.

Let $S_8$ be the set of eighth stage switches that the connection passes through but which are not reached through a switch in $T_7$.

Let $T_8$ be the set of eighth stage switches that can be reached from Z.

Let $S_9$ be the set of ninth stage switches that the connection passes through but which are not reached through a switch in $T_8$.

Add branches from Z to every switch in $(S_6 \cap T_6) \cup (S_7 \cap T_7) \cup (S_8 \cap T_8) \cup S_9$.

Through the use of these algorithms, high speed data packet switching systems may be utilized in a non-blocking manner for the routing of both new multi-point connections and also augmenting of existing multi-point connections with a minimal speed advantage for each network, thereby resulting in minimal cost therefor.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A multi-cast high speed data packet switching fabric, said fabric comprising a first network having means for handling point-to-point traffic and a second network connected back-to-back with said first network, said second network having means for handling multi-cast traffic, said first and second networks each being one of either a Benes network with a speed advantage of approximately $2k-1-2(k-2)/d$, a Clos network with a speed advantage of approximately $1+2d/m$, or a Cantor network with a speed advantage of approximately $1+2(k+1)/m-2(k-2)/dm$, and said switching fabric having means for adding a new multi-cast connection through both networks without blocking.

2. The switching fabric of claim 1 wherein said switching fabric further comprises means for augmenting an existing connection without blocking by rearranging, at most, only said connection being augmented.

3. The switching fabric of claim 2 wherein said first and second networks are Benes networks, said first and second networks thereby comprising a five-stage switching fabric, and each of said Benes networks thereby has a speed advantage of approximately 3.

4. The switching fabric of claim 1 wherein said augmenting means includes means for augmenting said existing multi-cast connection by adding an additional connection y, said switching fabric having five stages, each of said stages having a plurality of switches, said augmenting means having means for implementing the following method including the steps of:
  a. adding y to the connection if there is a branch of the connection in a fifth stage switch containing y, if there is no such fifth stage switch then
  b. connecting y through an available path from y to a fourth stage switch through which the connection passes, if there is no such fourth stage switch then
  c. connecting y through an available path from y to a third stage switch through which the connection passes, if there is no such third stage switch then
  d. re-routing the augmented multi-cast connection through all five stages.

5. A multi-cast high speed data packet switching fabric, said fabric being comprised of a pair of three-stage Benes networks connected back-to-back, the first of said networks having means for handling point-to-point switching and the second of said networks having means for handling multi-cast traffic, each of said Benes networks having a speed advantage of approximately $2k-1-2(k-2)/d$, said switching fabric having means for adding a new multi-cast connection through both networks without blocking.

6. The switching fabric of claim 5 wherein said switching fabric further comprises means for augmenting an existing connection without blocking by rearranging, at most, only said connection being augmented.

7. The switching fabric of claim 6 wherein said augmenting means includes means for augmenting said existing multi-cast connection by adding an additional output y, said switching fabric having five stages, said augmenting means having means for implementing the following method including the steps of:
  a. adding y to the connection if there is a branch of the connection in a fifth stage switch containing y, if there is no such fifth stage switch then
  b connecting y through an available path from y to a fourth stage switch through which the connection passes, if there is no such fourth stage switch then
  c. connecting y through an available path from y to a third stage switch through which the connection passes, if there is no such third stage switch then
  d. re-routing the augmented multi-cast connection through all five stages.

8. The switching fabric of claim 7 wherein the step of re-routing includes identifying the most lightly loaded third stage switch (Z), identifying that set of fourth stage switches through which the connection passes (S), identifying that set of fourth stage switches connected to Z with a bandwidth available for handling the connection (T), adding branches of the connection from Z to all switches in S intersection T, identifying the set of (W) of fifth stage switches that are joined to the connection by branches passing through a switch in the set S–T, and adding a branch from Z to each switch in W and to y using the method of the preceding steps.

9. In a multi-cast high speed data packet switching fabric, said fabric being comprised of a pair of three-stage Benes networks connected back-to-back, the first of said networks having means for handling point-to-point switching and the second of said networks having means for handling multi-cast traffic, each of said Benes networks having a speed advantage of approximately $2k-1-2(k-2)/d$, said switching fabric thereby having five stages, the improvement comprising a method for augmenting an existing data packet connection to an additional output (y) in a fifth stage switch, said method comprising the steps of:
  a. determining if a branch of the existing data packet connection terminates in the same fifth stage switch containing Y, if so, then
  b. adding y internally in said fifth stage switch to said connection, if not then
  c. connecting y through an available path from y to a fourth stage switch through which the connection passes, if no such fourth-stage switch then
  d. connecting y through an available path from y to a third stage switch through which the connection passes, if no such third stage switch then
  e. re-routing the augmented multi-cast connection through all five stages.

10. The switching fabric of claim 9 wherein the step of re-routing includes identifying the most lightly loaded third-stage switch (Z), identifying that set of fourth-stage switches through which the connection passes (S), identifying that set of fourth stage switches connected to Z with a bandwidth available for handling the connection (T), adding branches of the connection from Z to all switches in S intersection T, identifying the set of (W) of fifth stage switches that are joined to the connection by branches passing through a switch in the set S–T, and adding a branch from Z to each switch in W and to y using the method of the preceding steps.

11. In a multi-cast high speed data packet switching fabric, said fabric being comprised of a pair of three-stage Benes networks connected back-to-back, the first of said networks having means for handling point-to-point switching and the second of said networks having means for handling multi-cast traffic, each of said Benes networks having a speed advantage of approximately $2k-1-2(k-2)/d$, the switching fabric thereby having five stages, the improvement comprising a method for adding a new multi-cast connection through both networks without blocking, the method comprising the steps of:

a. identifying the most lightly loaded third stage switch (Z), adding a branch from the input of said new multi-cast connection to Z, and b. adding a branch from Z to each of the outputs of said multi-cast connection.

12. The method of claim 11 wherein the step of adding a branch from Z to each of the outputs comprises the steps of:

a. identifying those fourth-stage switches having a path to Z with an available bandwidth sufficient to carry the connection, said switches being defined as a set A, b. identifying those fourth-stage switches having a path to each output of the connection with a bandwidth great enough to carry the connection, said switches being defined as a set B, c. adding a connection between Z to each output by adding branches to through those switches in the intersection of said sets A and B.

13. In a multi-cast high speed data packet switching fabric, said fabric being comprised of a pair of five-stage Benes networks connected back-to-back, the first of said networks having means for handling point-to-point switching and the second of said networks having means for handling multi-cast traffic, each of said Benes networks having a speed advantage of approximately five, the switching fabric thereby having nine stages, the improvement comprising a method for adding a new multi-cast connection through both networks without blocking, the method comprising the steps of:

a. identifying the most lightly loaded third stage switch (Z), adding a branch from the input of said new multi-cast connection to Z, and b. adding a branch from Z to each of the outputs of said multi-cast connection.

14. The method of claim 13 wherein the step of adding a branch from Z to each of the outputs comprises the steps of:

a. if there is a branch in the ninth stage containing y, add y to connection at that point; else, if there is a path from y to an eighth stage switch that the connection passes through, connect y at that point; else, if there is a path from y to a seventh stage switch that the connection passes through, connect y at that point; else, if there is a path from y to a sixth stage switch that the connection passes through, connect y at that point; else, if there is a path from y to a fifth stage switch that the connection passes through, connect y at that point;

b. otherwise, let Z be most lightly loaded fifth stage switch and let $S_6$ be the sixth stage switches that connection passes through;

let $T_6$ be the sixth stage that can be reached from Z;

let $S_7$ be the seventh stage switches that the connection passes through but which are rot reached through a switch in $T_6$;

let $T_7$ be the seventh stage switches that can be reached from Z;

let $S_8$ be the eighth stage switches that the connection passes through but which are not reached through a switch in $T_7$;

let $T_8$ be the eighth stage switches that can be reached from Z;

let $S_9$ be the ninth stage switches that the connection passes through but which are not reached through a switch in $T_8$; and add branches from Z to every switch in $(S_6 \cap T_6) \cup (S_7 \cap T_7) \cup (S_8 \cap T_8) \cup S_9$.

* * * * *